March 28, 1961 K. T. BLEUER 2,976,759
ANTI-GLARE DEVICE FOR VEHICLES
Filed July 30, 1958
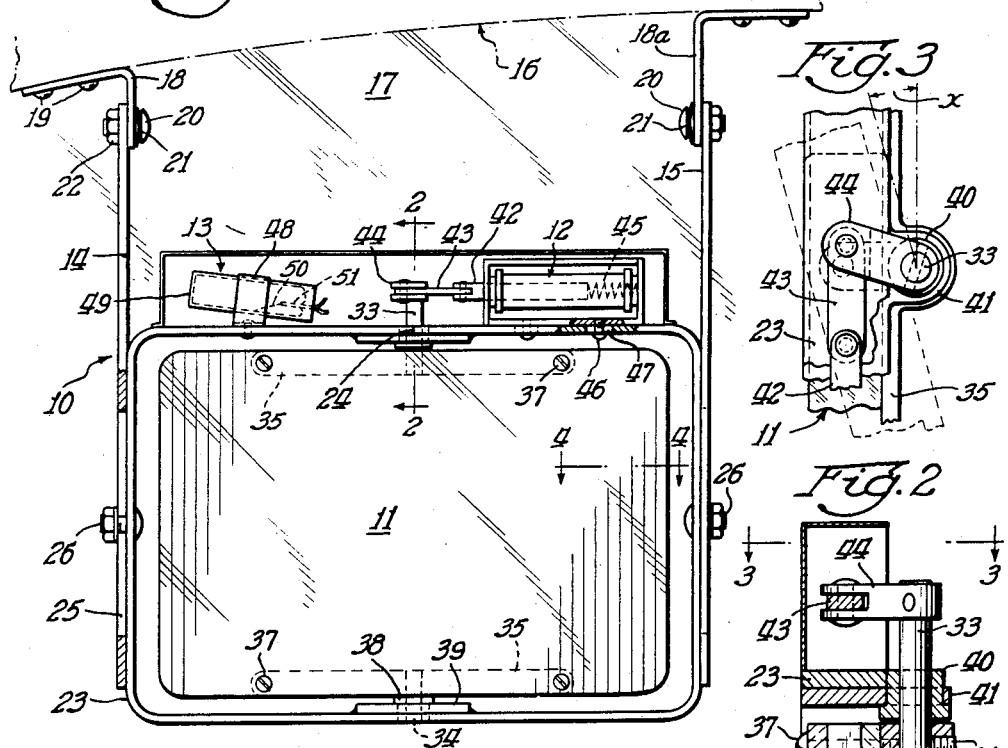
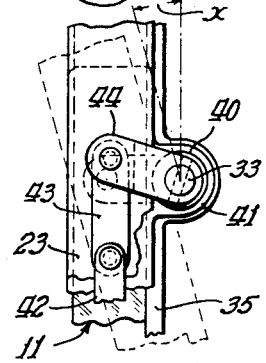
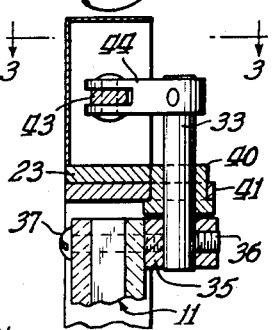
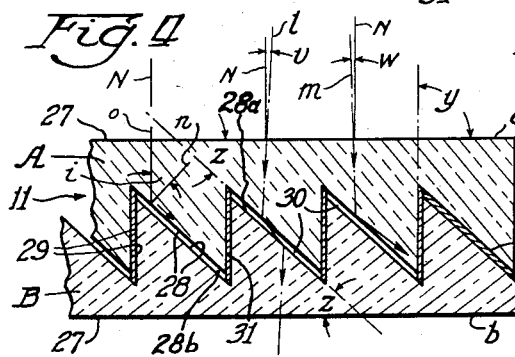
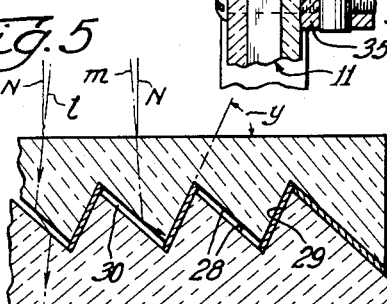
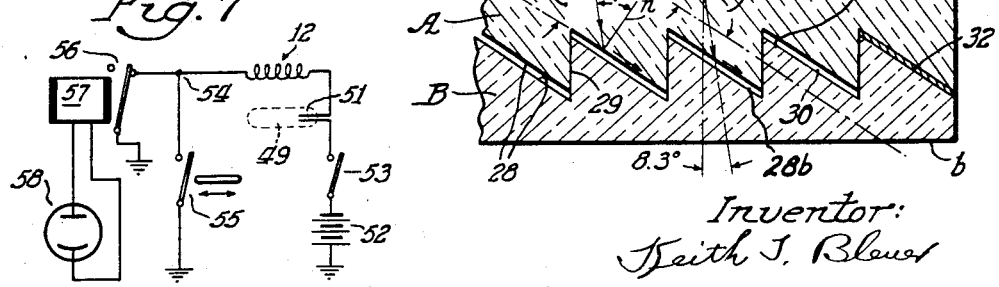
Inventor:
Keith T. Bleuer

2,976,759
Patented Mar. 28, 1961

United States Patent Office

2,976,759
ANTI-GLARE DEVICE FOR VEHICLES

Keith T. Bleuer, Roselle, Ill.
(1042 Kalfahs St., Neenah, Wis.)

Filed July 30, 1958, Ser. No. 752,069

1 Claim. (Cl. 88—1)

My invention relates to antiglare devices for automotive vehicles positioned behind the vehicle windshield for shielding the eyes of the vehicle driver from the headlamps of an approaching vehicle.

As is well known, in the United States, automobiles are driven on the right hand lanes of roads; and in driving at night the headlamps of approaching vehicles on the other or left hand lane with respect to any particular automobile shine into the eyes of the driver, making it very difficult for him to see to drive in his lane.

It is an object of the invention to provide an improved antiglare shield which functions to block the admission of light from the headlamps of approaching vehicles in the left hand lane but admits light from the right hand lane on which the vehicle is being driven, such as from objects in the right hand lane illuminated by the headlights of the vehicle equipped with the antiglare shield.

It is another object to provide such a glare shield that may be actuated, preferably electrically, from a condition in which it blocks light from the left hand lane as above mentioned to a condition in which it admits light from both lanes of the road. In this connection, it is a more particular object to provide such a glare shield that may be oscillated between a position in which it admits light from both lanes of the road to a position in which it admits light from only the right hand lane and blocks light from the left hand lane.

It is another object to provide such an improved glare shield which is made up of a pair of identical plates of transparent material, such as the plastic known in the trade and trade-marked as "Plexiglas" or "Lucite" and which requires therefore only one mold.

It is another object of the invention to provide mechanism for oscillating the glare shield between its light blocking and non-blocking positions under the control of the driver's foot and/or a light sensitive cell subject to light from the headlamps of an approaching vehicle in the left hand lane.

In a preferred form, the glare shield is a shield of transparent material having front and rear flat faces and internal vertical prism faces. It is made up of two identical plates, each of which has a flat face on one side and a series of prism faces on the other side. The prism faces of the two plates are interfitted together so that the prism faces of the two plates extend parallel with each other and are slightly spaced with an air gap. The prism faces are at such an angle with respect to the flat front face that when the glare shield is in a certain light blocking oscillated position, the prism faces of the front shield are at the critical angle or greater with respect to the light entering the shield from the left hand lane to block the light from proceeding through the shield, but are at less than the critical angle with respect to the light from the right hand lane so that light rays from the right hand lane pass across the air gap and through the rear shield to the eyes of the driver.

The invention consists of the novel constructions, arrangements and devices to be hereinafter described and claimed for carrying out the above stated objects and such other objects as will be apparent from the following descriptions of a certain preferred embodiment of the invention, illustrated with reference to the accompanying drawing, wherein:

Fig. 1 is a rear view of an antiglare device embodying the principles of the invention (looking from the driver's seat of the vehicle, forwardly);

Fig. 2 is a sectional view on an enlarged scale taken on line 2—2 of Fig. 1;

Fig. 3 is a partial top view of the antiglare device taken from line 3—3 of Fig. 2;

Fig. 4 is a partial sectional view of a still further enlarged scale taken on line 4—4 of Fig. 1;

Figs. 5 and 6 are sectional views similar to Fig. 4 but of two different additional embodiments of glare shield; and Fig. 7 is a diagrammatic illustration of electrical controlling mechanism for the antiglare device.

Like characters of reference designate like parts in the several views.

Referring now to the drawing, the illustrated antiglare device comprises generally framing 10, a glare shield 11 of transparent material oscillatably mounted in the framing 10, a solenoid 12 mounted on the framing 10 and a mercury switch 13 also mounted on the framing 10.

The framing 10 comprises a pair of spaced metal arms 14 and 15. The arm 14 is swingably attached to the conventional metal rim 16 above the glass windshield 17 of the vehicle in which the antiglare device is installed by means of a bracket 18. The bracket 18 itself may be fixed to the rim 16 by means of screws 19, and a bolt 20 extends through the bracket 18 and arm 14 to swingably mount the arm on the bracket. A spring washer 21 is provided between the head of the bolt 20 and the bracket 18, and a nut 22 holds the spring washer 21 in compression to provide a good frictional bearing between the arm 14 and bracket 18. The arm 15 is similarly fastened to the rim 16 by means of a bracket 18a, corresponding to the bracket 18 but slightly larger, and a bolt 20 and washer 21.

A rectangular frame 23 comprising a metal strip closed at 24 is disposed between the arms 14 and 15. Each of the arms 14 and 15 is provided with a slot 25, and a bolt 26 extends through the frame and through each of the slots for adjustably fixing the frame 23 between the arms 14 and 15.

The glare shield 11 comprises two identical parts, namely, a front part A adjacent the windshield 17 and a rear part B adjacent the driver's seat of the vehicle. Each of the parts A and B has a flat face 27 which constitutes the front face *a* and rear face *b*, respectively, of the glare shield 11. Internally each of the parts A and B is formed with vertical flat prism faces 28 alternated with flat connecting faces 29. The parts A and B are disposed together so that the faces 28 extend parallel to each other, spaced by a small gap 30, filled with air, for example, and with the faces 29 extending parallel to each other and being spaced apart by a thickness of paper 31. The parts A and B are identical, and as will be apparent, the parts are simply reversed with respect to each other. A thickness of paper 32 is preferably provided between the faces 28 on the opposite ends of the shield 11 for the purpose of holding the parts A and B spaced to provide the air gaps 30 and for an additional purpose to be mentioned. The surfaces 28 are clear and light transmitting, and the surfaces 29 are preferably sand blasted, frosted, or otherwise roughened.

The prism surfaces 28 are at an angle $z$ with respect to the surfaces 27 of the parts A and B, which is the critical angle of the transparent material of which the parts A and B are formed relative to the medium in the gaps 30 which is air in this case. The critical angle of the transparent material is that angle for the prism faces 28 at which a ray of light proceeding normally or at right angles through the front face $a$ of the part A just grazes the surface of the faces 28 in the part A and does not pass through the gaps 30 into the part B. For air-Plexiglas or Lucite interfaces, as at the gaps 30, the critical angle is $z$ 42.2 degrees, with the Plexiglas or Lucite having an index of refraction of 1.489.

The shield 11 is oscillatably mounted in the frame 23 by means of upper and lower shafts 33 and 34. Each of the shafts is fixed on to a metal bar 35, by a set screw 36 and a pair of screws 37 extend through the parts A and B and into the bar 35 for holding the parts A and B together and fixed with respect to the bar. The lower shaft 34 is rotatably disposed in a journal or bearing 38 carried by a part 39 fixed to the frame 23 and the upper shaft 33 is rotatably disposed in a similar bearing 40 carried by a part 41 also fixed with respect to the frame.

The electric solenoid 12 is arranged to oscillate the shield 11. The solenoid comprises a movable core 42 connected by a link 43 with an arm 44 which is pinned on the shaft 33. A spring 45 is provided in the solenoid for yieldably holding the shield 11 and the parts 42, 43 and 44 in their illustrated full line positions. The solenoid 12 is adjustably fixed to the frame 23 by means of two screws 46 threaded into the solenoid and extending through two slots 47 provided in the frame 23.

The mercury switch 13 is mounted on the top of the frame 23 by means of a clip 48 and comprises a container 49 for a body of mercury 50. A pair of contacts 51 extend into the container and have electrical contact made between them when the mercury is at the end of the container at which the contacts are disposed. The switch 13 and mercury container are disposed at the angle shown—extending downwardly when the shield 11 is in its illustrated position to cause the mercury 50 to run in a body toward the contacts 51 at the right end of the container 49 as seen in Fig. 1.

The electrical mechanism for controlling the oscillation of the shield 11 comprises the conventional automobile battery 52 connected by a switch 53 with one of the contacts 51 of the mercury switch 13. The switch 53 may be the conventional headlamp switch for the vehicle. The other contact 51 is connected with one end of the solenoid 12, and the other end of the solenoid is connected to a terminal 54. The terminal 54 may be connected to either a vehicle driver operated switch 55 or a relay switch 56 and is shown connected to both switches, which is also satisfactory. The switch 55 is grounded so as to ground the terminal 54 when the switch is closed, and the switch 55 is preferably located on the floorboard of the vehicle adjacent the usual headlamp dimmer switch controlled by the vehicle driver's left foot. The switch 56 is also grounded to ground the terminal 54 when the switch is closed, and is controlled by a relay 57 which is connected to a photoelectric cell 58 so located in the vehicle to be subject to the light from the headlamps of approaching vehicles on the left hand lane.

The embodiment of light shield hsown in Fig. 5 is the same as the embodiment previously described except the connecting faces 29 have been disposed at an angle $y$ of 65 degrees instead of the 90 degrees. The swing of the light shield under the influence of the solenoid 12 for satisfactory operation for a shield which is approximately 8 inches in width may be 25 degrees indicated by the angle $x$ in Fig. 3, and the angle $y$ has likewise been changed in the Fig. 5 embodiment from 90 degrees to 65 degrees, for purposes which will be described.

The Fig. 6 embodiment of light shield is substantially the same as the Fig. 4 embodiment except that the faces 28 are at 33.9 degrees with respect to the surfaces $a$ and $b$ instead of 42.2 degrees (both of these angles being particularly suitable for use when the parts A and B are made of Plexiglas or Lucite which has an index of refraction of 1.489). The Fig. 6 embodiment also differs from the Fig. 4 embodiment in that the connecting surfaces 29 are not separated by paper sheet, but are instead together. The surfaces 29, in addition to being sandblasted, have also been painted in this embodiment to take the place of the paper sheet, as will be described, although either sandblasting or painting may be used alone with satisfactory results.

In operation, the glare shield 11 is positioned in its full line position as seen in Figs. 1, 2 and 3 (in the plane of the frame 23) in order to block light from an approaching vehicle in the left hand lane and to pass light from the right hand lane in which the vehicle equipped with the glare shield is travelling. Referring to Fig. 4, a ray of light $l$ passes through the parts A and B and across the air gap 30 nearly parallel with the surfaces 28 while a ray of light $m$ is internally reflected on a prism face 28 of the part A. This is true because the light ray $m$ is at an angle $w$ with respect to and to the right of a normal N to the front surface $a$ of the shield 11 while the light ray $l$ is at an angle $v$ with respect to and to the left of a normal N to the front face $a$ and because the prism faces 28 are the critical angle $z$ with respect to the surfaces $a$ and $b$. A light ray passing into the shield 11 exactly on a normal N will graze a prism face 28 in the part A and will thus be internally reflected in the part A and will not pass through the shield 11 in the same manner as the light ray $m$. Thus it is apparent that the light ray $m$ and also other light rays from directions to the left of normals N to the front surface $a$, which would be from the headlamps of an approaching vehicle in the left lane, are blocked and internally reflected by the prism faces 28, so that the headlamps do not shine into the eyes of the driver of the vehicle equipped with the glare shield; while the light ray $l$ and other light rays from the rigth of normals N, which would be from objects in the right lane illuminated by the headlamps of the vehicle equipped with the glare shield, pass through the shield and permit the driver to see objects in his lane and to see the right side of the road.

The light ray $m$ and all other light rays from the left of a normal N which are internally reflected in the part A on the prism surfaces 28 are blocked from further passage through the shield 11 by the strips of paper 31. The surfaces 29 are also preferably sandblasted or otherwise roughened, and this surface finish also helps to absorb and block further passage of these light rays through the shield 11 in any direction. The surfaces 29 may, instead of having the strips of paper 31 positioned between them for the purpose of blocking these light rays, be sandblasted or painted, or both, and the paint and sandblasted finish serve the same purpose. The sandblasted finish in particular desirably reduces reflection from the surfaces 29, and the painting and/or sandblasting may be continued over the apices and groove bottoms of parts A and B slightly on to surfaces 28, to points 28$a$ from the apices and to points 28$b$ from the groove bottoms, for example, for further helping in this respect. Obviously, inasmuch as the faces 29 and the other sandblasted or painted surfaces of the two parts A and B are in face to face relation, the painting or sandblasting may be omitted on one of these parts if the other is so treated. The paint, strips of paper 31 and sandblasting of the surfaces 29 may be omitted and the shield will still function to attenuate or reduce light rays to the left of the normals N, but the shield functions better to block these light rays if the surfaces 29 are treated in one or more of these ways.

The reflecting action of the prism surfaces 28 is due to the fact that a ray of light inside Plexiglas or Lucite which hits a surface in contact with air at an incident angle of 42.2 degrees (the critical angle) or more will not pass through the interface but will be internally reflected from the interface. For example, referring to Fig. 4, a light ray *o* which is exactly on a normal N to the surface *a* impinges on a prism surface 28 on the part A at an incident angle *i* (measured from the normal *n* to the surface 28 on the part A) which is the critical angle of 42.2 degrees of the Lucite or Plexiglas with respect to air. The light ray *o* just grazes the surface 28 and strikes the paper 31 or paint or sandblasted finish on the adjacent surface 29 to be blocked. It follows that all other rays at a greater angle *i* (proceeding from the left of a normal N) are likewise reflected and blocked. All light rays at a less angle *i* (proceeding from the right of a normal N) pass through the surfaces 28 and across the gaps 30. It will be observed that the angle between the light ray *o* before and after it strikes a surface 28 on the part A is the critical angle *i* of 42.2 degrees plus 90 degrees, since the normal *n* is perpendicular to the surface 28, which is 132.2 degrees.

The rays that are from directions to the right of normals N, such as the ray *l*, pass through the prism faces 28 of the part A and strike the adjacent prism surfaces 28 of the part B. Since the prism surfaces 28 of the two parts A and B are parallel, these rays are bent back at the surfaces 28 of part B at the same angle as they are bent in passing through the surfaces 28 of the part A, so that these rays proceed through the part B in the same direction as in the part A. Inasmuch as the front and rear surfaces *a* and *b* are parallel, the rays passing through the shield are bent as much by refraction in passing through the surface *a* as the surface *b* but in opposite directions, so that rays passing through the shield emerge from the shield in the same directions as in which they entered. In brief, the incident and emerging rays of light passing through the shield 11 are parallel and therefore there is no distortion, due to the principle that the final and original directions of a ray passing through a series of media are parallel when the media are each separated from the next by one of a series of parallel refracting planes, assuming that the first and last media have the same index of refraction. It should be noted also that whatever prism action the surfaces 28 of the part A have in separating the light passing through the part A into its component colors is reversed and rectified by the surfaces 28 of the part B in parallel with the surfaces 28 of the part A, so that the shield 11 as a whole has substantially no light dispersion action.

When the vehicle on the left side of the road is passed, the vehicle driver will probably wish to see the complete width of road, the left lane as well as the right. At this time the solenoid 12 is energized by means of the link 43 and arm 44 rotates the shield 11 through an angle *x* as seen in Fig. 3, which I have found may be 25 degrees for a shield having a width of 8 inches for satisfactory operation. When so rotated, substantially all of the rays striking the shield 11 are on the right side of normals N, similar to the illustrated ray *l*, and all of these proceed through the shield 11, as does the ray *l*, passing through the part A to the prism surfaces 28, being bent at these prism surfaces to pass through the air gap 30 nearly parallel to the air gap, striking the opposite surfaces 28 and being bent back by them to proceed through the part B in the same direction as in the part A. The rays emerge from the shield 11 in the same direction as they entered, and the two lanes of road are seen undistorted by the vehicle driver.

If the shield is rotated about the journals 38 and 40 slowly, the shield seems to, in effect, pull a dark curtain across the shield in front of the driver, which is the action of the prism surfaces 28 as above described. Therefore, in order to clear the blanking curtain from the shield insofar as the driver is concerned, the shield should be rotated toward its dotted line position as seen in Fig. 3 until the blanking curtain disappears. Therefore, the angle of rotation *x* is dependent on the width of the shield 11, and should be greater if the shield is wider.

Due to the fact that the connecting surfaces 29 are preferably frosted or sandblasted and may have paint applied to them or have the paper 31 between them, they do not reflect and thereby do not provide deceptive second images to the vehicle driver. I have found that the paper strips 32 at the ends of the shield 11 also obviate undesirable images at the shield ends.

The connecting faces 29 are substantially parallel to the line of sight of the driver when the shield 11 is in its light blocking position in the plane of the frame 23 and are at angles of 25 degrees to the line of sight when the shield 11 is oscillated 25 degrees into its dotted line position for viewing the complete road. If it is desired to have the surfaces 29 present the least obstruction to view when the shield 11 is in its full road viewing position, the surfaces 29 may be put at the angle *y* of 65 degrees as seen in Fig. 5, so that the surfaces are parallel to the line of sight of the driver under these circumstances. As will be obvious, the angle *y* may otherwise be changed depending on the conditions under which it is desired that the surfaces 29 present their greatest light blocking action. For example, the angle *y* may be made 77½ degrees (midway between 65 degrees and 90 degrees), so that the same light obstructing action of the surfaces 29 is had at either oscillated position of the shield 11.

The angle *z* may also be changed while still securing the beneficial light blocking action of the shield 11. The angle *z* is shown as 33.9 degrees in the Fig. 6 form of the shield 11. At this angle, if the parts A and B are Plexiglas or Lucite, the light blocking action will take place when the shield is rotated 12½ degrees clockwise as seen in Fig. 3. In order to obtain this action, the set screw 36 is simply loosened and then retightened with the shield 11 being in a position rotated clockwise 12½ degrees from its full line position as seen in Fig. 3. Then, when the solenoid 12 is energized, the shield 11 is rotated 25 degrees, so that at the other limit of its oscillation it is 12½ degrees counterclockwise from its full line position as seen in Fig. 3, midway between its full line and dotted line positions as seen in this figure. At the two viewing positions of the shield, therefore, it is at a 12½ degree angle with respect to the line of vision of the driver, rather than being at a zero angle in one position and a 25 degree angle in the other position as in the other embodiments. With the shield 11 being in its light blocking position, a light ray *p* which is at 12½ degrees to the normal N will just graze a prism face 28 and will be totally reflected and will be blocked from further transmission through the shield by the paint on the surfaces 29. The same is true for other light rays greater than the 12½ degrees with respect to the normal N. In this case, there is some refraction that takes place at the front surface *a* of the shield 11. The ray *p* that enters the face *a* at 12.5 degrees is refracted at the face *a* so as to instead proceed through the part A at 8.3 degrees with respect to the normal N. In order to be reflected from a surface 28, the surface 28 should be at least 132.2 degrees (previously referred to, which is 90 degrees plus 42.2 degrees, the critical angle) with respect to the ray passing through the part A, so therefore, the angle *z* is 33.9 degrees to obtain this result. The same basic considerations apply to this form of the shield as to those previously described—if the light rays travelling through the part A strike the surfaces 28 of the part A at the critical angle of 42.2 degrees or greater measured from normals *n* to the surface 28, the rays are reflected by the surfaces 28, but if the rays strike the surfaces 28 at less than this angle measured from the normals *n*, in this case the rays are transmitted by the surfaces 28 of the part A and pass across the gaps 30 and through the part B to the eyes of the driver. A light ray *p* is shown in Fig. 6 illustrating this point. After being bent at the surface *a* from 12.5 degrees to 8.3 degrees from the normal N, it impinges on a surface 28 of the part A at an incident angle of 42.2 degrees measured from the normal $n$ to the surface 28 and grazes the surface 28, so that it is blocked by the painted surface of the adjacent face 29. All rays to the left of the rays $p$ will therefore be blocked by the shield, while the rays to the right of the rays $p$ will pass through the shield 11, quite similarly to the light blocking action of the other embodiments. When the shield 11 as shown in Fig. 6 is rotated through the 25 degrees by the action of the solenoid 12, all rays from the road will be to the right of the rays $p$ as seen in Fig. 6 and will be less than 132.2 degrees with respect to the surfaces 28, that is, they will impinge on the surfaces 28 at an incident angle of less than the critical angle of 42.2 degrees from normals $n$, so that they will all pass through the shield 11 similarly as described for the other embodiments.

The solenoid 12 may be energized either under control of the switch 55 or the switch 56 or both. Assuming that the terminal 54 is connected only to the switch 55, the solenoid may be energized and deenergized by opening and closing the switch 55 which is preferably a floor switch located adjacent the conventional dimmer switch for the vehicle headlights and operable by the left foot of the driver. When the solenoid is energized, the shield is moved into full road viewing position from its light blocking position. The mercury switch 13 is also in the circuit, and the circuit through this switch is closed whenever the frame 23 is in its illustrated depending position.

If the switch 56 is connected to the terminal 54 and the switch 55 is disconnected from the terminal, the solenoid 12 is controlled by the light entering the vehicle from the approaching vehicles. When this light is above a certain brightness, the photoelectric cell 58 provides enough current through the relay 57 to open the switch 56 and thereby deenergize the solenoid 12, so that the spring 45 moves the shield 11 to its light blocking position. When the other vehicle has been passed, the switch 56 returns to its closed position thereby energizing the solenoid 12 and returning the shield 11 to its full road viewing position.

When both the switches 55 and 56 are connected to the terminal 54, the switches act individually as just described. When either of the switches 55 and 56 is closed, the solenoid is energized to hold the shield 11 in full road viewing position.

When the shield 11 is not in use, the frame 23 is moved upwardly against the roof of the vehicle, with the arms 14 and 15 pivoting on the bolts 20. The spring washers 21 hold the arms 14 and 15, frame 23 and shield 11 upwardly. When in the upward position, the mercury in the container 49 flows to the left end of the container and opens the circuit through the switch 13. Therefore, regardless of closing of the switch 53, the soelnoid 12 is not energized, and the shield 11 remains in its position in the plane of the frame 23.

I have found in actual practice that it is not necessary to have the prism faces 28 separated by a substantial gap 30. The paper strips 32 may be omitted, and the opposite faces 28 may be allowed to come into contact with the same results as described. I ascribe this to the fact that probably unevenness in the shield parts A and B and surfaces 28 actually hold the surfaces 28 very slightly spaced, so that actually there is a very fine air gap between the surfaces 28, which functions as the gap 30 illustrated.

Other transparent materials besides Plexiglas and Lucite, which are acrylic plastics, may of course be used for the parts A and B, such as glass. Other transparent materials, besides air, may be used in the gaps 30, but must of course have a different index of refraction than the materials of which the parts A and B are made. The angles $z$ and $y$ may also be changed depending on the angle of the shield 11 at which the minimum of light obstruction by the faces 29 is desired and depending on the angle of the shield 11 with respect to straight forward of the vehicle it is desired that the shield perform its function of dividing the light from the left and right road lanes.

Although the anti-glare device has been described for use on United States roads on which a vehicle travels on the right side, it is apparent that the device would be useful on roads on which the travel is on the left side. The frame 23 would simply be reversed or turned through 180 degrees along with the shield 11, between the arms 14 and 15. The mercury switch could simply be omitted in the Fig. 7 circuit. The shield 11 could also be useful as a sun shield by turning it 90 degrees clockwise as seen in Fig. 1 and mounting it thus between the arms 14 and 15. The switch 13 could be omitted in this case also.

I wish it to be understood that my invention is not to be limited to the specific constructions and arrangements shown and described, except only insofar as the claim may be so limited, as it will be apparent to those skilled in the art that changes may be made without departing from the principles of the invention.

I claim:

An angular discriminating light shield comprising a pair of plates of light transmitting material, each of said plates having a flat surface on one side and a series of flat prism faces on the other side at angles to the first named flat surface and connected by connecting faces extending generally transversely to the plate, said plates being interfitted together so that the prism faces of the plates lie face to face having an air space therebetween so as to transmit light through the shield from one direction and to reflect light on to said connecting faces from certain other directions, said connecting faces also lying face to face, and having a frosted, light diffusing finish for substantially reducing specular reflection from and also reducing specular light transmission through these faces, regardless of angle of incidence of light thereon.

References Cited in the file of this patent

UNITED STATES PATENTS

| | | |
|---|---|---|
| 1,350,277 | Grondahl et al. | Aug. 17, 1920 |
| 1,458,635 | Whitney | June 12, 1923 |
| 1,854,892 | Ewend | Apr. 19, 1932 |
| 2,003,248 | Chilowsky | May 28, 1935 |
| 2,074,247 | Armstrong | Mar. 16, 1937 |
| 2,722,862 | Schwede | Nov. 8, 1955 |
| 2,731,872 | Schwede | Jan. 24, 1956 |

FOREIGN PATENTS

| | | |
|---|---|---|
| 429,340 | Great Britain | May 27, 1935 |
| 458,509 | Great Britain | Dec. 14, 1936 |